Feb. 29, 1944.  J. J. JAKOSKY  2,342,866
RIVET
Filed Oct. 20, 1942  2 Sheets-Sheet 1
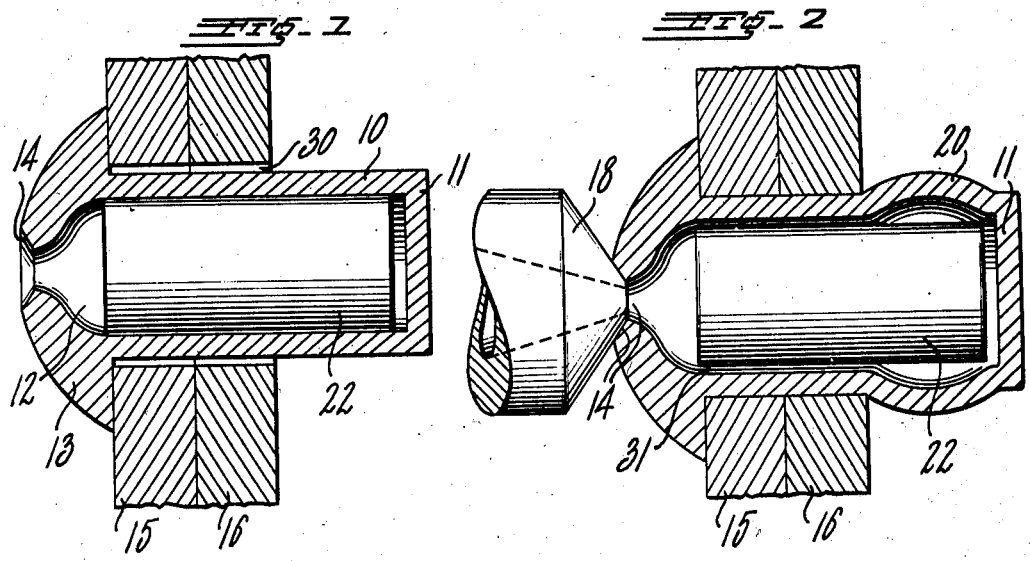
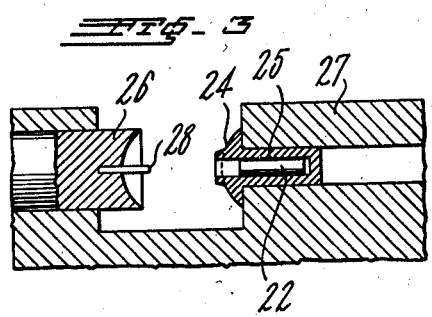
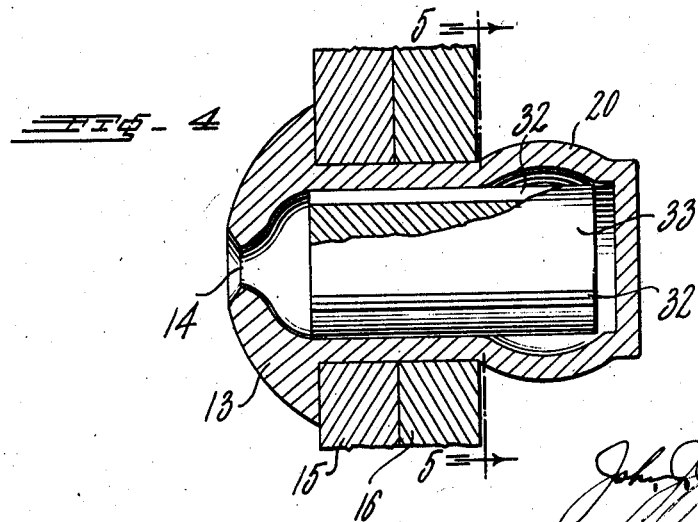
INVENTOR.

Feb. 29, 1944.  J. J. JAKOSKY  2,342,866
RIVET
Filed Oct. 20, 1942  2 Sheets-Sheet 2
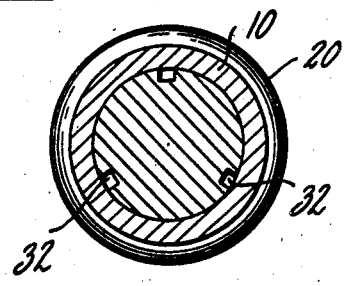
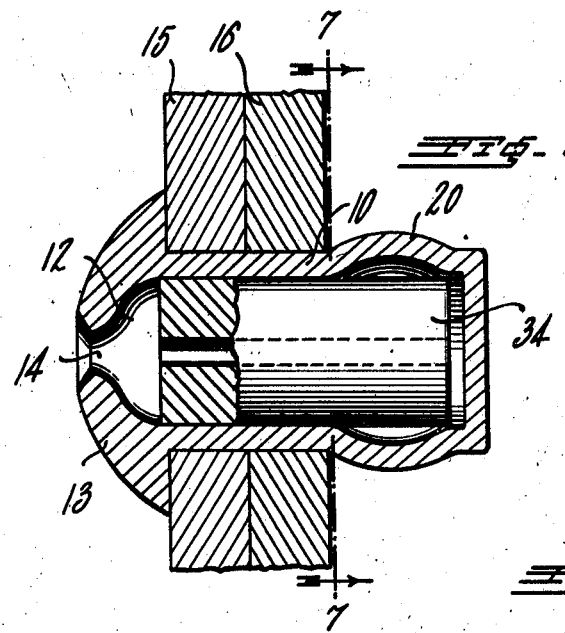
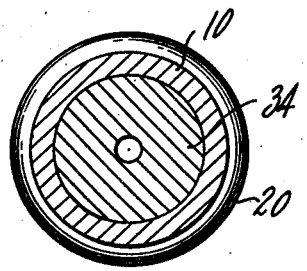
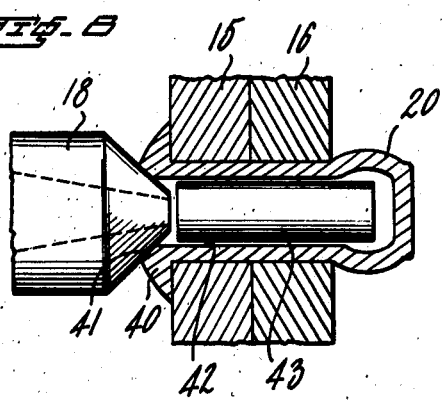
INVENTOR.

Patented Feb. 29, 1944

2,342,866

UNITED STATES PATENT OFFICE 2,342,866

RIVET

John J. Jakosky, Lawrence, Kans.

Application October 20, 1942, Serial No. 462,670

8 Claims. (Cl. 85—40)

This invention relates to hollow rivets which are set or expanded by hydraulic pressure within the rivet, and is an improvement on the rivets disclosed in my applications Serial No. 406,729, filed August 13, 1941, and Serial No. 441,589, filed May 4, 1942. Such rivets have a hollow shank, closed at its set-end, and constituting an hydraulic pressure chamber which is open through the head of the rivet. Hydraulic pressure is supplied through the head to expand the shank into tight contact with the rivet hole and to form a head on the projecting, or set-end of the shank. This is achieved by stretching the wall of the shank. Such rivets are highly satisfactory for many uses, but these uses are limited on the one hand by the relatively low strength in shear of the hollow shanks, and on the other hand by the pressures which can readily be applied by hand tools, or to delicate parts being riveted, to expand the shanks the requisite amount.

It is among the objects of the present invention to increase the shear strength of hollow rivets, and to reduce the pressure which is needed to set rivets of a given strength. Other objects and advantages of the invention will be apparent in the following description and accompanying drawings, in which:

Fig. 1 is a longitudinal section of one form of rivet embodying the invention, in position to join a pair of plates and before setting or heading;

Fig. 2 is a view corresponding to Fig. 1 after the rivet has been set;

Fig. 3 is a longitudinal section showing a step in the manufacture of a rivet embodying the invention;

Fig. 4 is a view corresponding to Fig. 2 showing a modified form of the invention;

Fig. 5 is a section on the line 5—5 of Fig. 4;

Fig. 6 is a view corresponding to Fig. 2 showing still another modification;

Fig. 7 is a section on the line 7—7 of Fig. 6; and

Fig. 8 is a section corresponding to Fig. 2 showing another modified form of the invention.

As shown in Fig. 1 a rivet has a hollow shank formed by a relatively thin side wall 10 and closed end 11 which provides an hydraulic pressure chamber 12. The head 13 has a duct 14 communicating with the chamber 12. The area of the cross section of the neck of the duct is much smaller than the area of the cross section of the chamber 12, which latter is preferably of uniform diameter. The shank passes through the plates 15 and 16 which are to be joined, and may extend beyond the plates a distance substantially equal to the diameter of the shank. As shown in Fig. 2, when the rivet is to be set, any suitable pressure-applying tool 18 is held against the head in the neck of the duct, and liquid is forced into the hollow stem, under sufficient pressure to stretch the wall 10 to expand the free end of the shank into a bulbous head 20. The liquid used for expanding the rivet is preferably self hardening, such as a lacquer or thermoplastic material which remains in the rivet and fills the shank and neck, thus reducing air resistance, if the rivets are used on airplane wings.

It is evident that the thinner the wall 10, the smaller will be the force required to stretch it to form a head and (for a rivet of a given diameter) the smaller will be the pressure required to be supplied by the tool 18. One limiting factor in the use of rivets of the character described is the force or thrust required between the tool 18 and the head of the rivet in order to maintain a sealing contact between the two and thus maintain the required pressure within the rivet. Within practical limits any desired pressure can be supplied by the tool 18, for example 20,000 pounds per square inch, but the tool must be held against the head of the rivet with sufficient force or thrust to keep this pressure, in being transmitted into the rivet, from floating the tool away from the rivet. This thrust is equal to the area of the cross section of the duct at the point where the tool connects with it, multiplied by the pressure required to expand the rivet. For this reason the duct is made very small, reducing the force which the workman is required to exert to practical limits. It may be impractical for a workman to exert, repeatedly in day-long production, a thrust in excess of thirty pounds, and in many riveting constructions where the work cannot be backed up, as in the blind riveting of airplane wings, the structure itself may not be able to sustain a thrust of greater value. Consequently not only is it important to have the diameter of the neck as small as practical, but it is also necessary to have the wall of the rivet as thin as is practical, since both of these factors reduce the thrust of the tool which is required to set the rivet.

Prior to the present invention the minimum thickness of the wall of the rivet was limited by the shear load of the rivet and the shear strength it was required to exert to keep the plates 15 and 16 from sliding with respect to each other. The present invention permits the use of very thin-walled rivets which can be set by low thrust of pressure tools, yet which exert a shear strength comparable to that of solid rivets. This is accomplished by inserting in the hollow shank of the rivet a shear member or pin 22 which does not interfere with the hydraulic setting of the rivet, and which takes up part of the shear load. The shear member is placed in the shank during the manufacture of the rivet.

Referring to Fig. 3, the rivet at an intermediate stage of its manufacture has a partly formed head blank 24, and a uniform bore 25 extending through the head into the stem. The shear pin 22, of the proper length substantially to fill the stem after the rivet is completed, is inserted in this bore, and the head blank is formed to make the restricted duct 14 by forging the rivet between a heading tool 26 and holder 27. The heading tool has a sizing pin 28 against which the metal is forged to form the duct 14 of the desired diameter. The rivet when completed is as shown in Fig. 1.

The shear pin may be of various forms and may have various relationships to the bore of the stem, according to the purpose and conditions of use of the rivet. Where a slight clearance is permissible between the shear pin and the bore of the rivet, a smooth cylindrical pin as shown in Fig. 1 may be used. When this is first placed in the rivet it fits the bore loosely enough to permit easy insertion. The rivet may have a slight clearance indicated at 30 in Fig. 1 between the outside of the shank and the holes in the plates 15 and 16. When the pressure is applied to set the rivet, liquid flows between the shear pin and the wall of the rivet, since the pin does not have a pressure tight fit. The pressure of the liquid stretches the wall of the rivet until it assumes the form shown in Fig. 2 in which the shank of the rivet is forced into a tight fit with the walls of the holes in the plates, the end is expanded into the head 20, and there is a slight clearance 31 between the shear pin and the interior of the rivet.

In other instances it may be desired to have the rivet fit the holes tightly and at the same time have the shear pin fit the rivet tightly after the rivet is set. In such cases a shear pin of one of the forms shown in Fig. 4 or Fig. 6 may be used. In both these forms, the area of the cross section of the pin is less than the area of the cross section of the chamber in the shank, so that there is passageway for liquid under pressure. In Fig. 4 this is effected by providing grooves 32 in the outer surface of the pin 33, which has a tight fit in the shank of the rivet. In Fig. 6 the pin 34 is a hollow tube, having a thick wall, which has a tight fit with the shank. In both cases it is preferable for the rivet to have a tight fit in the holes in the plates.

Where the rivet is of small size so that the area of the cross-section of the chamber within the shank multiplied by the pressure of the setting tool does not require too great a thrust on the tool, the constricted neck may be dispensed with and rivets of the form shown in Fig. 8 may be used. In this modification the rivet head 40 has a seat 41 surrounding the opening into the chamber of the uniform bore 42. A shear pin 43 of any of the forms disclosed in Figs. 2, 4 and 6 may be used. In such case the shear pin is retained in the rivet before setting by friction or in any desired manner and it may be retained in place after setting in any suitable manner, for example by using a self-hardening lacquer as the setting fluid which after hardening serves to cement the shear pin in place.

Where the rivet is used in places subject to electrolytic corrosion or decomposition such as in pontoons exposed to salt water, the core should be of a material having an electropotential comparable to the material of the rivet, or the core may be made of inert material such as a hard plastic having the requisite strength in shear.

The invention thus provides a rivet having a very thin wall which can be set with low pressure and consequent low thrust on the setting tool, and yet which has a shear strength corresponding to the strength of a solid rivet, since under any tendency to collapse, the wall of the rivet comes in contact with the shear pin, which together with the wall, resists the shearing force.

The range of applicability of such rivets can be even further increased by forming the rivet of material of low tensile strength, which easily expands under pressure, and using a very rigid shear pin of material of high tensile strength.

Having thus described my invention, what I claim and desire to protect by Letters Patent is:

1. In a rivet an integral body of a material adapted to develop a permanent set, the body including a head and a shank, the shank being formed with a closed end and an hydraulic pressure chamber extending axially within the shank, the body having an opening through the head communicating with the chamber, the area of the cross section of the opening being less than the area of the cross-section of the chamber, and a rigid shear member within the chamber and constructed substantially to fill a large portion of the chamber and to be retained therein by the portion of the head that surrounds said opening.

2. In a rivet an integral body of a material adapted to develop a permanent set, the body including a head and a shank, the shank being formed with a closed end and an hydraulic pressure chamber extending axially within the shank, the body having an opening through the head communicating with the chamber, the area of the cross-section of the opening being less than the area of the cross-section of the chamber, and a rigid shear member within the chamber and substantially filling a large portion of the chamber, the area of the cross-section of the shear member being less than the area of the cross-section of the chamber to provide a fluid passage extending the length of the chamber.

3. In a rivet an integral body of a material adapted to develop a permanent set, the body including a head and a shank, the shank being formed with a closed end and an hydraulic pressure chamber extending axially within the shank, the body having an opening through the head communicating with the chamber, the area of the cross-section of the opening being less than the area of the cross-section of the chamber, and a rigid shear member within the chamber, the shear member having a size to fit tightly within the bore of the chamber and being of smaller cross-sectional area than the cross-sectional area of the chamber to provide a fluid passage extending the length of the chamber.

4. In a rivet an integral body of a material adapted to develop a permanent set, the body including a head and a shank, the shank being formed with a closed end and an hydraulic pressure chamber extending axially within the shank, the body having an opening through the head communicating with the chamber, the area of the cross-section of the opening being less than the area of the cross-section of the chamber, and a rigid tubular shear member within the chamber and substantially filling a large portion of the chamber.

5. In a rivet an integral body of a material adapted to develop a permanent set, the body including a head and a shank, the shank being formed with a closed end and an hydraulic pressure chamber extending axially within the shank, the body having an opening through the head communicating with the chamber, the area of the cross-section of the opening being less than the area of the cross-section of the chamber, and a rigid fluted shear member within the chamber and substantially filling a large portion of the chamber.

6. In a rivet, an integral body of a material of relatively low shear strength adapted to develop a permanent set, the body including a head and a shank, the shank being formed with a closed end and an hydraulic pressure chamber extending axially within the shank, the body having an opening through the head communicating with the chamber, the area of the cross-section of the opening being less than the area of the cross-section of the chamber, and a shear member of relatively high shear strength within the chamber and constructed substantially to fill a large portion of the chamber and to be retained therein by the portion of the head that surrounds said opening.

7. In a rivet an integral body of a material which is adapted to develop a permanent set, the body including a head and a shank, the shank being formed with a closed end and a chamber extending axially within the shank and adapted to receive fluid under pressure, the body having an opening through the head of less area in cross-section than said chamber and communicating with the chamber for transmitting fluid under pressure, a seat for fluid transmitting means on said head surrounding said opening and a rigid shear member in the chamber that substantially fills a large portion of the chamber and shaped, so that it will not pass through said opening and to permit the passage of fluid under pressure through the head of the rivet and to the opposite end of the chamber.

8. In a rivet an integral body of a material which is adapted to develop a permanent set, the body including a head and a shank, the shank being formed with a closed end and a chamber extending axially within the shank and adapted to receive fluid under pressure, the body having an opening through the head communicating with said chamber for transmitting fluid under pressure, an approximately conical seat for fluid transmitting means on said head surrounding said opening, and a rigid shear member in the chamber that substantially fills a large portion of the chamber and adapted to permit the passage of fluid under pressure between the shear member and wall of the chamber.

JOHN J. JAKOSKY,